March 14, 1944. H. T. LAMBERT 2,343,984
BRAKE CONTROL SYSTEM
Filed Oct. 31, 1941 2 Sheets-Sheet 1
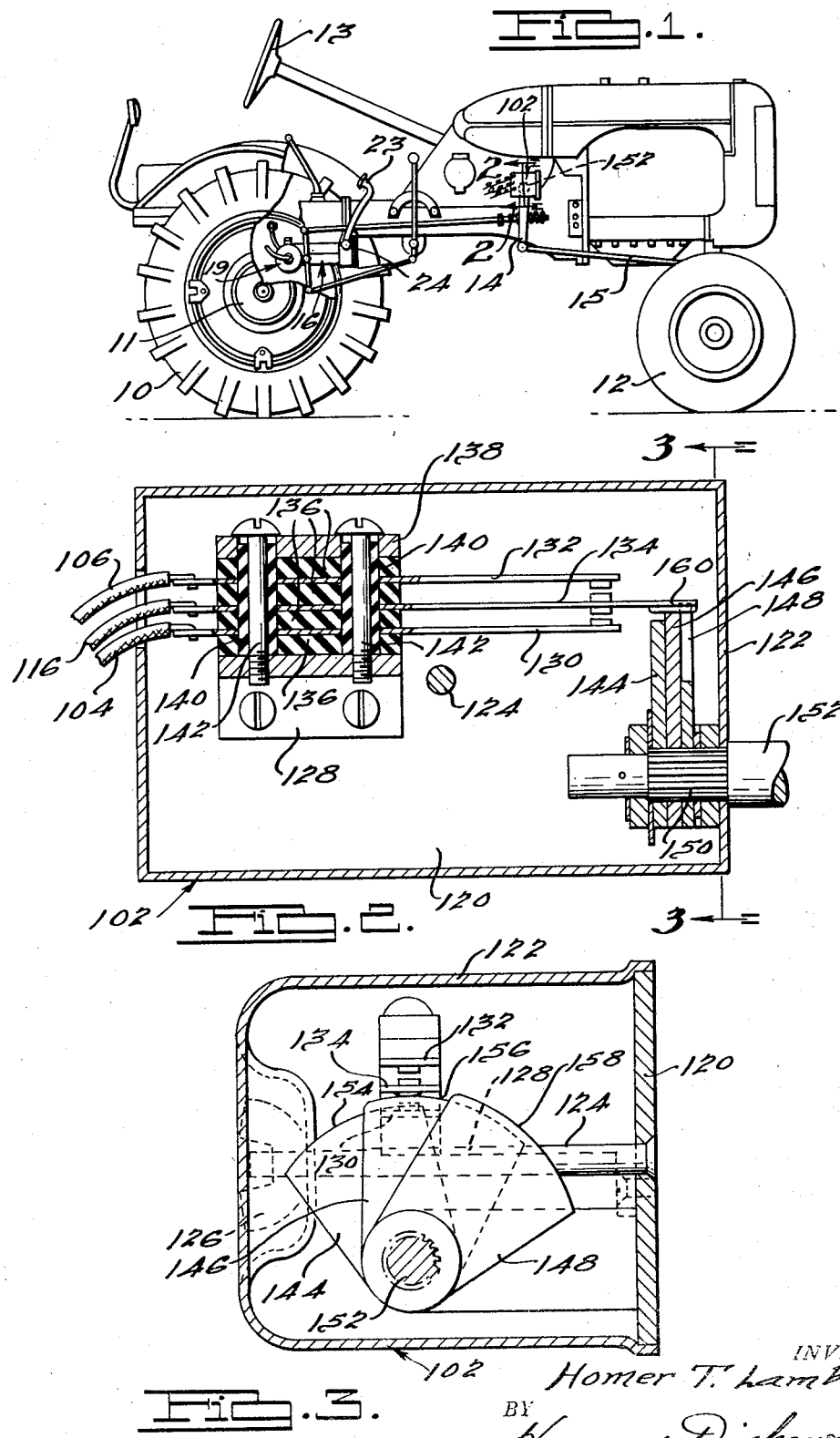
INVENTOR
Homer T. Lambert.
BY
Harness, Dickey & Pierce.
ATTORNEYS.

March 14, 1944.   H. T. LAMBERT   2,343,984
BRAKE CONTROL SYSTEM
Filed Oct. 31, 1941   2 Sheets-Sheet 2
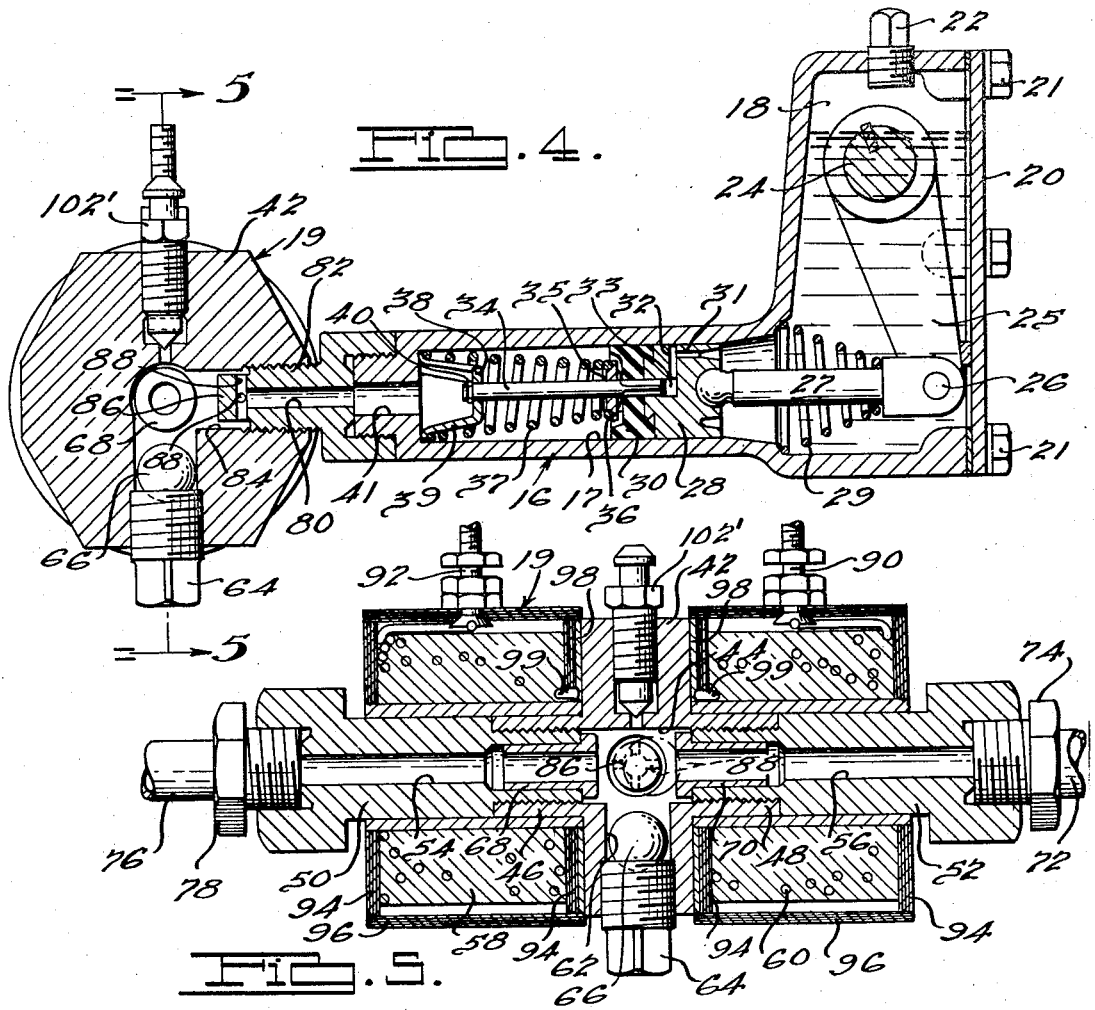
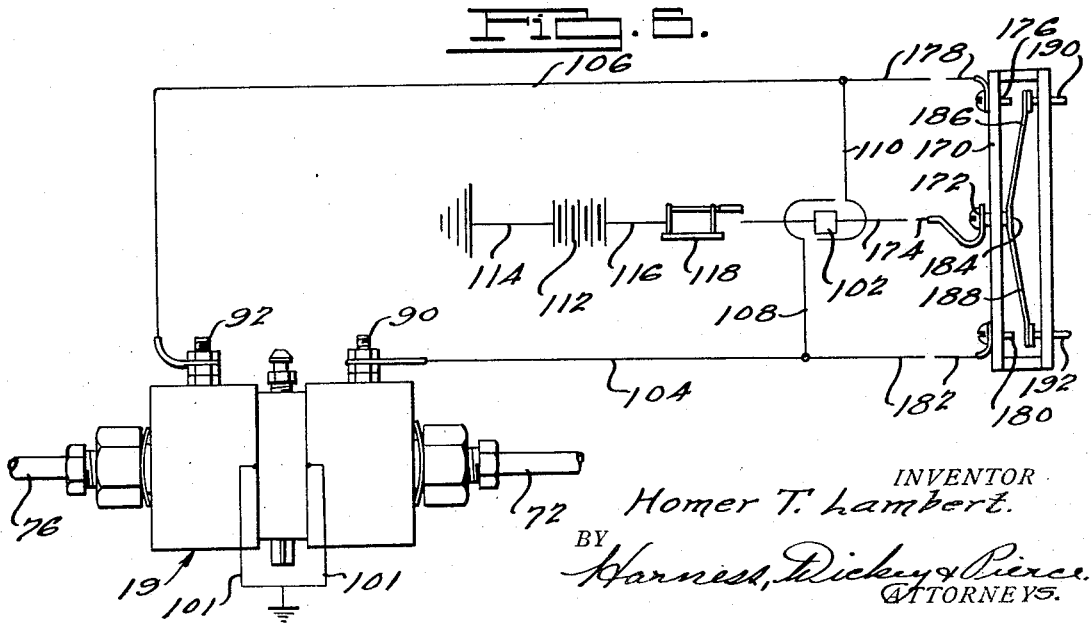
INVENTOR
Homer T. Lambert.
BY
Harness, Dickey & Pierce.
ATTORNEYS.

Patented Mar. 14, 1944

2,343,984

UNITED STATES PATENT OFFICE 2,343,984

BRAKE CONTROL SYSTEM

Homer T. Lambert, St. Joseph, Mich., assignor to The Lambert Brake Corporation, St. Joseph, Mich., a corporation of Michigan Application October 31, 1941, Serial No. 417,308

6 Claims. (Cl. 180—18)

The present invention relates to tractors and particularly relates to improvements in the means for facilitating the steering thereof by selective application of the brakes. In certain respects, the present invention relates to improvements over the construction disclosed and claimed in the copending application of Homer T. Lambert et al., Serial No. 359,766, filed October 4, 1940, now Patent No. 2,264,537, issued December 2, 1941.

One of the primary objects of the present invention is to provide improved means to facilitate the making of sharp turns with a tractor by selective application of the brakes.

Another object of the present invention is to provide improvements in devices of the type mentioned in which the brakes are fluid actuated and in which there is no leakage in the system, particularly through the control valve.

Another object of the invention is to provide improvements in controls of the type mentioned in which the controls are automatic and positive in their action.

A further object of the invention is to provide improvements in controls of the type mentioned, so that the tractor is adapted for proper operation under various conditions, such as normal work conditions, when one or the other of the wheels is in the mud or in a rut, and when driving on a highway.

Another object of the present invention is to provide improvements in controls of the type mentioned in which any bank of pressure in the off-brake will force the metal ball element of the valve away from its seat just enough to permit the surplus fluid to be released, thereby preventing heating or dragging of the brake on either side.

Another object of the invention is to provide an actuating means which may be adjustably set for operation at various radii of turns.

Other objects of the invention will become apparent from the following specification, the drawings relating thereto and from the claims hereinafter set forth.

In the drawings, in which like numerals are used to designate like parts in the several views throughout:

Figure 1 is a side elevational view of a conventional form of tractor, with parts broken away to show some of the interior constructions and embodying the brake control means of the present invention;

Fig. 2 is an enlarged cross-sectional view taken substantially along the line 2—2 of Fig. 1;

Fig. 3 is a cross-sectional view taken substantially along the line 3—3 of Fig. 2;

Fig. 4 is a vertical cross-sectional view of a master cylinder and control valve assembly illustrative of the present invention;

Fig. 5 is a cross-sectional view taken substantially along the line 5—5 of Fig. 4; and, Fig. 6 is a side elevational view of the control valve of Fig. 5 and diagrammatically illustrating the wiring diagram thereof.

Referring to the drawings, a conventional tractor is illustrated in Fig. 1, such tractor having a pair of driving wheels 10, one at each side of a transverse axle 11, mounted at the rear thereof. Only one of the driving wheels 10 appears in the view, the other being broken away to show some of the interior construction. The tractor is provided with front wheels 12, which are mounted in any conventional or suitable manner for steering, and the wheels 12 are steered by a steering wheel 13, which acts through a steering arm 14 and rod 15 in the usual manner. Each of the rear wheels of the tractor is provided with an hydraulic brake (not shown), which may be of any desired form and construction, but is preferably of the type disclosed in the Homer T. Lambert Patents Nos. 2,063,444, 2,099,489, 2,161,359 and 2,161,360.

The brakes of the rear wheels are energized by a master cylinder assembly, shown best in Fig. 4. This assembly comprises a unitary casting, generally indicated at 16, which is provided with a central cylindrical bore 17. A brake fluid reservoir 18 is provided at one end of the cylinder 17 and a valve housing, generally indicated at 19, is provided at the opposite end of the cylinder 17. The reservoir 18 is completed and closed by a cover plate 20, which is held in place by any suitable means, such as cap screws 21, which extend into suitable bosses in casting 16. The reservoir is provided with a suitable filler opening closed by a removable plug 22.

A brake operating pedal 23 (Fig. 1) is pivoted on a brake shaft 24, which extends into the reservoir 18 and carries an arm 25, which is connected by pin 26 and a push rod 27 to a brake actuating piston 28 positioned within the bore 17. A suitable spring 29 seats at one end against the casting 16 and at the other against a shoulder on the push rod 27, thereby acting in a direction to return the pedal to release position.

The piston 28 is provided with a rubber disc 30 on its forward face adapted to seal it against leakage between the piston and the cylinder wall. There is provided, however, a plurality of communicating passageways 31, 32, and a central bore 33 by means of which fluid may, under certain circumstances, flow through the piston. Extending into the central bore 33 of the piston is a valve rod 34, having its righthand extremity, which is located within the bore 33, of approximately square cross-section in order that fluid may flow past the rod 34 within the bore 33.

Welded to the rod 34 adjacent the piston 28 is a valve disc 35, having a seating edge 36 adapted when seated against the rubber disc 30 to close communication through the passageways 31, 32 and the bore 33. A spring 37, positioned within the cylinder, normally acts upon the valve disc 35, forcing it against the piston, thereby acting to maintain the valve closed and at the same time to urge the piston 28 toward brake release position.

The lefthand extremity of the valve rod 34 is guided by means of a spider 38, having a plurality of legs 39, there being three of such legs in the embodiment described, against the out-turned extremities of which seats the spring 37. A snap ring 40 is seated within a suitable groove in the lefthand extremity of the valve rod 34 and acts to limit movement of the valve rod to the right under the influence of the spring 37. The parts are so proportioned that when the foot pedal is released, spring 29 shifts the pedal and the piston 28 far enough to the right so that a slight opening of valve 35, 36 occurs. As a result, when the brakes are in release position, fluid may flow from reservoir 18 through passages 31 and 32 and bore 33 to the lefthand side of piston 38, thereby compensating for any leakage which might occur in the pressure lines to the brakes.

The bore 17 is connected by a counterbore 41 to the interior of the valve 19. The valve 19 is of the electromagnetic type and includes a non-magnetic valve body portion 42, which may be made from brass, or other suitable metal that will not be affected by magnetic torque or magnetic attraction. The body portion 42 is formed with a transverse bore 44 having tubular projecting portions 46 and 48 which are internally threaded. Steel cores 50 and 52, having reduced and threaded inner ends, are threadably received within the projections 46 and 48, respectively. The cores 50 and 52 are tubular in form, thus providing longitudinally extending channels or conduits 54 and 56, respectively, therethrough. Such cores are the cores for the electric coils 58 and 60, respectively, which are wound in the usual manner and disposed at the sides of the valve body portion 42 in embracing and surrounding relation to the core members 50 and 52. The cores 50 and 52 may be formed from any metal that will become highly magnetized when a current of electricity passes through the coils 58 and 60.

The valve body 42 is provided with a downwardly directing portion forming a valve chamber 62. A metal plug 64, which is formed of brass or other non-magnetic material, is threadably received within the body portion 42 for providing access to the chamber 62 so that a metal ball valve 66 may be disposed therein which is adapted to be set upon a depressed portion formed in the inner surface of the plug 64. The ball 66 is formed from a suitable magnetic metal to have the highest magnetic attraction obtainable. This ball will rest in its seat in the lower portion of the chamber 62, being held there by gravity until an electric current is produced in either one of the coils 58 and 60, at which time the corresponding core 50 or 52 is magnetized to attract the ball over the end of the corresponding core, thus blocking the passage into conduit 54 or 56, depending of course upon which coil is energized.

Non-magnetic, metal, tubular bushings 68 and 70, which are relatively thin, are pressed into the inner ends of the cores 50 and 52, respectively, so as to prevent the metal ball from adhering to or sticking to its seat with respect to the cores 50 and 52. This is a safety measure in order to insure proper and positive action of the valve in that the cores 50 and 52 and the ball 66 may retain a portion of the magnetism and the ball would then not release or disengage itself from that core to which it was attracted. With the thin portions of the non-magnetic members 68 and 70, the ball will drop as soon as the electric current is disconnected or the circuit is broken.

A tubular fluid pressure conduit 72 is connected to the hexhead end of the core 52 through a tube nut 74 so that the tubular conduit is in registry with the conduit 56. Such conduit 72 leads to and provides the pressure line connected to one of the brakes, for example the right brake. A similar fluid conduit 76 is connected to the core 50 by a tube nut 78 in communication with the conduit 54 and leads to the other brake, namely, the left brake.

A fluid under pressure from the master cylinder 16 is conducted into the interior of the valve 19 through an inlet channel 80 formed in an inlet plug 82 formed from a non-magnetic metal. Such plug 82 is received within a tapped opening provided in the valve body 42 and communicates with an inlet chamber 84 which is located centrally of the valve body between the inner ends of the cores 50 and 52. Such member 82 is threadably fastened to the end of the master cylinder so that the channel 80 is in open communication with the channel 41.

The outlet end of the member 82 is so formed as to check the fluid pressure entering the core of the member 42 just enough to prevent the metal ball 66 from lifting by the force of the fluid and to prevent a straight flow of fluid and spread it against the side walls of the valve body. This prevents swirling of the fluid under high velocity and thereby prevents any agitation of the ball 66 under pressure. To accomplish this the inner end 86 of the valve body is of reduced diameter with respect to the diameter of the chamber 84 and is provided with a plurality of transversely extending apertures 88 which are drilled crosswise of the inner end. Thus the fluid under pressure entering through conduit 80 strikes against the baffle end 86 and is diverted radially outwardly through apertures 88 into the space between the small end of the plug and the wall of the chamber 84.

With the ball in the position shown in 66 and without energizing either of the coils 58 and 60 it will be seen that when the fluid under pressure enters through conduit 80 such fluid under pressure passes through both of the conduits 54 and 56 to the brake pressure lines 76 and 72, respectively. However, when it is desired to make a sharp turn, according to the present invention, means are provided for energizing one of the coils so that fluid to one of the brakes is blocked off and the other brake only will be acted upon to assist in maneuvering, by turning, the tractor.

Such means includes a terminal post 90 which is electrically connected to the coil 60, and another terminal post 92 which is electrically connected to the coil 58. Suitable fastener nuts are associated with the posts 90 and 92 for fastening wire connections thereto.

Each of the coils or spools 58 and 60 is provided with end insulating flanges 94 having cylindrical insulating covers 96 associated therewith so that the coils are encased within insulation.

In order to form the ground for the coils 58 and 60, brass washers 98 are interposed between the inner insulating members 94 and the valve body portion 42. The coils 58 and 60 are electrically connected to the grounds 98 by means of metal, electrical conducting members 99 which project through the inner insulating members 94. Ground wires 101 are connected to the members 98 and are suitably grounded as shown in Fig. 6.

An air vent plug 102' is provided in an air vent passageway formed in the body 42 which communicates with the inner chambers thereof for bleeding air from the valve and from all of the connecting fluid lines in order to provide for proper operation of the fluid brakes.

An electric circuit for the operation of the control valve 19 is diagrammatically illustrated in Fig. 6.

An automatic steering switch 102 (to be described in detail hereinafter), is provided which is connected through a wire 104 with the terminal 90 of coil 60. The switch is also connected through a wire 106 with the terminal post 92 of the coil 58. A contact 108 connects the switch 102 with the wire 104; and another contact 110 connects the switch 102 with the wire 106.

An electric storage battery 112, or other source of electrical power, is provided to energize the coils of the valve 19. Such battery 112 is grounded on one side as indicated at 114 and is connected to the automatic switch through a wire 116 having a knife switch 118 interposed therein.

For a detailed description of the switch 102 reference may be had to Figs. 2 and 3. Such switch 102 is mounted adjacent the rocker arm of the steering mechanism, as shown in Fig. 1, and includes a base 120 having a cover 122 associated therewith and connected thereto by means of a post 124 and wing nut 126 to provide a casing.

A supporting bracket 128 is mounted to the base 120 and supports thereon spring terminals 130, 132, and 134. The terminals 130 and 132 correspond to the elements 108 and 110, respectively, and are connected to the wires 104 and 106, respectively.

The center spring terminal 134 is connected to the wire 116. Fiber insulation 136 is disposed between the terminals 130, 132 and 134 and also between the top and bottom plates 138. Fiber insulating tubes 140 extend through apertures in the top plate and abut against the bottom plate and also pass through apertures in the terminals 130, 132, and 134. Clamping screws 142 pass through the members 140 and are threaded into tapped openings in the bottom plate for holding the assembly together.

The control switch also includes three leaves 144, 146, and 148. Each of such leaves is provided with a serrated opening therethrough so that the leaves may be fixed upon the serrated portion 150 of the steering arm shaft 152 to which the arm 14 is also fixed. The members 144, 146 and 148 may be fixed against axial displacement on the serrated portion of the shaft by means of suitable collars and a cotter pin, for example. The leaves 144, 146, and 148 are formed with arcuate surfaces 154, 156 and 158, respectively. Such surfaces are on arcs of different radii disposed about the center of the shaft 152 with the radius of leaves 144, 146 and 148 becoming progressively greater as clearly shown in Fig. 3. The leaves are suitably displaced with respect to each other about the shaft by angularly positioning them and fixing them in such position on the serrated portion of the shaft through cooperation of the serrated portions of the shaft and leaves. It will thus be seen that the leaves may be positioned in a plurality of different positions with respect to each other which, in effect, provides an adjustment so that the operator can turn on a long radius or a short radius, as desired, depending upon the relative positions of the leaves on the shaft.

It will be appreciated that as the steering wheel 13 is turned, the steering arm shaft 152 is correspondingly turned so that the leaves are turned therewith. With the leaves and shaft 152 in the position shown in Fig. 3 which is the straight ahead position for the vehicle, it will be seen that the projecting end 160 of the spring contact 134 will be in engagement with the arcuate portion 156 of the leaf 146. When the shaft 152 is rotated in a counter-clockwise direction, viewing Fig. 3, it will be seen that the projecting end 160 engages the arcuate surface 158 so that the spring contact 134 is urged upwardly making electric contact with the contact 132. This closes the circuit through the wire 106 and energizes the coil 58 so that the ball 66 is pulled up to close the passageway 54. The fluid under pressure will then enter through the passage 56 to the right brake.

When the shaft 152 is turned in a clockwise direction as viewed in Fig. 3, the projection 160 will be in engagement with the shortest arcuate surface 154, and the spring arm 134 will then contact the terminal 130 to complete the circuit through the wire 104 and to energize the coil 60. The ball 66 will then be drawn into position to close the conduit 56, and the oil under pressure may pass through conduit 54 and through the conduit 76 to the left brake.

When desired, the switch 118 may be opened so that the valve 19 is ineffective to operate when the steering wheel is turned. This is for normal driving along the ordinary highway.

Manual means is also provided for energizing either of the coils 58 or 60. Such manual means includes a switch frame 170 which may be disposed in a convenient location adjacent the operator. Such switch includes a central terminal 172 which is connected to the battery through a wire 174; an end terminal 176 which is connected to the wire 106 through a wire 178; and another end terminal 180 which is connected to the wire 104 through a wire 182. A spring contact member 184 is fixed to the central terminal 172 and has oppositely diverging spring arms 186 and 188 which extend to positions overlying the ends of the contacts 176 and 180. Plungers 190 and 192 are slidably mounted in the frame 170 adjacent the ends of portions 186 and 188, respectively. By depressing either of the members 190 or 192, the corresponding end 186 and 188 will be urged against its contact 176 or 180. When the circuit is closed through contact 176, it will be appreciated that the coil 58 is energized; or when the plunger 192 is depressed the circuit through contact 180 would be closed to energize the coil 60.

The construction just described provides a manual means for operating the valve 19 without the need of the automatic steering switch 102.

What is claimed is:

1. In a tractor having a pair of rearwardly positioned driving wheels, one on each side thereof, a front dirigible wheel, means for turning said dirigible wheel at an angle to the driving wheels to steer the tractor, an hydraulically actuated brake on each of said driving wheels, a brake master cylinder, a separate fluid connection between said master cylinder and each brake, and magnetic valve means interposed in the connection between said master cylinder and each said brake, said valve means including an inlet associated with said master cylinder, an outlet conduit associated with each of said separate fluid connections, means for magnetizing each of said outlet conduits, said valve means including an element responsive to the magnetizing of either of said outlet conduits to block the flow of fluid therethrough, and electric means operatively connecting said valve means with said turning means so that said magnetic valve means is energized when said dirigible wheel is turned beyond a predetermined angle.

2. In a tractor having a pair of rearwardly positioned driving wheels, one on each side thereof, a front dirigible wheel, means for turning said dirigible wheel at an angle to the driving wheels to steer the tractor, an hydraulically actuated brake on each of said driving wheels, a brake master cylinder, a separate fluid connection between said master cylinder and each brake, and magnetic valve means interposed in the connection between said master cylinder and said brakes, said valve means including an inlet associated with said master cylinder, an outlet conduit associated with each of said separate fluid connections, independent means for magnetizing each of said outlet conduits, said valve means including an element responsive to the magnetizing of either of said outlet conduits to block the flow of fluid therethrough, and means to render effective said independent means operable in response to the turning of said dirigible wheel when said dirigible wheel is turned a predetermined angle with respect to the rear wheels.

3. In a tractor having a pair of rearwardly positioned driving wheels, one on each side thereof, a front dirigible wheel, means for turning said dirigible wheel at an angle to the driving wheels to steer the tractor, an hydraulically actuated brake on each of said driving wheels, a brake master cylinder, a separate fluid connection between said master cylinder and each brake, and magnetic valve means interposed in the connection between said master cylinder and each said brake, said valve means including an inlet associated with said master cylinder, an outlet conduit associated with each of said separate fluid connections, electric coils embracing said outlet conduits for magnetizing such conduits, means operatively connecting said valve and said turning means for energizing said coils when said dirigible wheel is turned beyond a predetermined angle, and said valve means including a magnetically attracted element responsive to the magnetizing of either of said outlet conduits to block the flow of fluid therethrough.

4. In a tractor having a pair of rearwardly positioned driving wheels, one on each side thereof, a front dirigible wheel, means for turning said dirigible wheel at an angle to the driving wheels to steer the tractor, an hydraulically actuated brake on each of said driving wheels, a brake master cylinder, a separate fluid connection between said master cylinder and each brake, and magnetic valve means interposed in the connection between said master cylinder and said brakes, said valve means including an inlet associated with said master cylinder, an outlet conduit associated with each of said separate fluid connections, electric coils embracing each of said outlet conduits for magnetizing such conduits, means for energizing said coils, said valve means including an element responsive to the magnetizing of either of said outlet conduits to block the flow of fluid therethrough, and means to render effective said energizing means operable in response to the turning of said dirigible wheel when said dirigible wheel is turned a predetermined angle with respect to the rear wheels.

5. In a tractor having a pair of rearwardly positioned driving wheels, one on each side thereof, a front dirigible wheel, means for turning said dirigible wheel at an angle to the driving wheels to steer the tractor, an hydraulically actuated brake on each of said driving wheels, a brake master cylinder, a separate fluid connection between said master cylinder and each brake, and magnetic valve means interposed in the connection between said master cylinder and each said brake, said valve means including an inlet associated with said master cylinder, an outlet conduit associated with each of said separate fluid connections, independent means operatively connecting said valve and turning means for magnetizing each of said outlet conduits, and said valve means including an element responsive to the magnetizing of either of said outlet conduits to block the flow of fluid therethrough.

6. In a tractor having a pair of rearwardly positioned driving wheels, one on each side thereof, a front dirigible wheel, means for turning said dirigible wheel at an angle to the driving wheels to steer the tractor, an hydraulically actuated brake on each of said driving wheels, a brake master cylinder, a separate fluid connection between said master cylinder and each brake, and magnetic valve means interposed in the connection between said master cylinder and said brakes, said valve means including an inlet associated with said master cylinder, an outlet conduit associated with each of said separate fluid connections, independent means for magnetizing each of said outlet conduits, said valve means including an element responsive to the magnetizing of either of said outlet conduits to block the flow of fluid therethrough, and adjustable means to render effective said independent means operable in response to the turning of said dirigible wheel when said dirigible wheel is turned a predetermined angle with respect to the rear wheels.

HOMER T. LAMBERT.